June 20, 1950  H. W. PROTZELLER  2,511,875
METHOD OF REFRIGERATING FOOD PRODUCTS
Filed Oct. 7, 1943  3 Sheets-Sheet 2
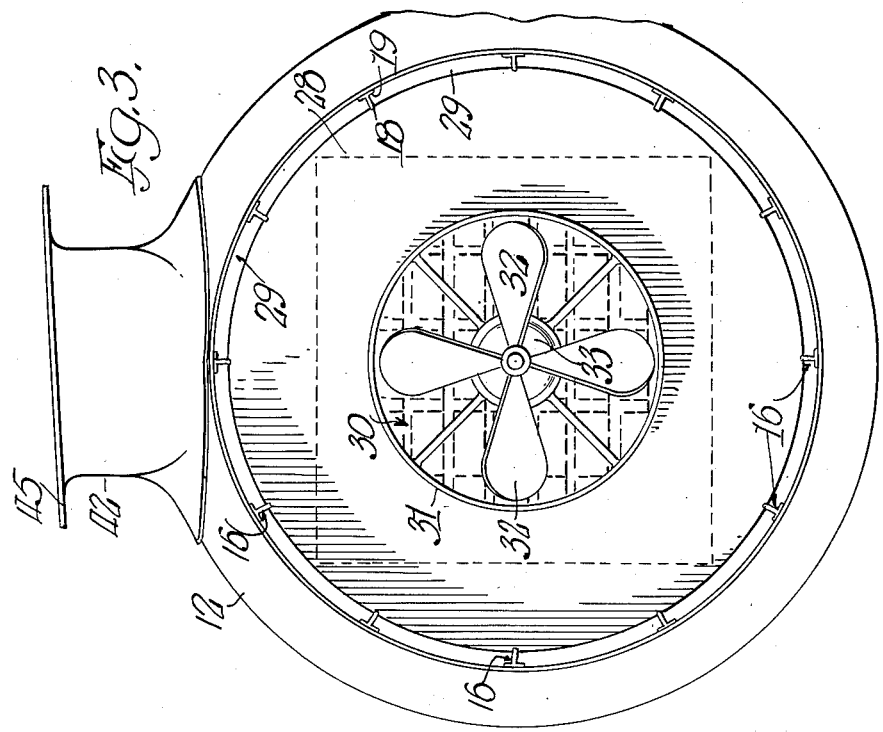
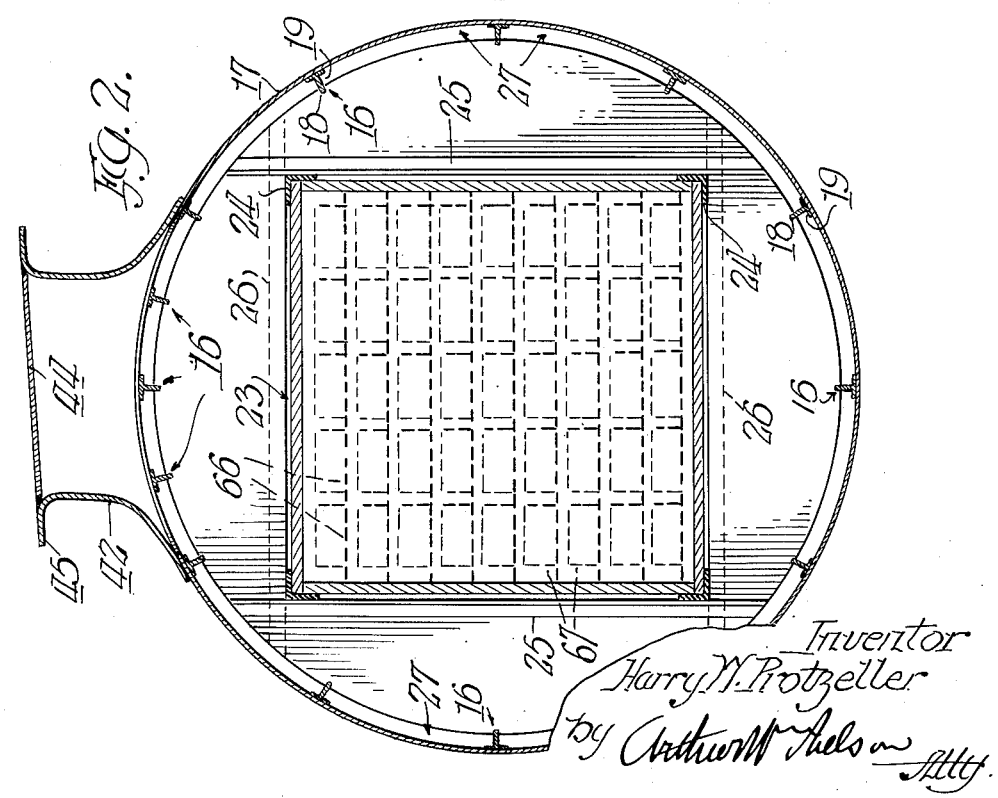
Inventor
Harry W. Protzeller June 20, 1950 H. W. PROTZELLER 2,511,875
METHOD OF REFRIGERATING FOOD PRODUCTS
Filed Oct. 7, 1943 3 Sheets-Sheet 3
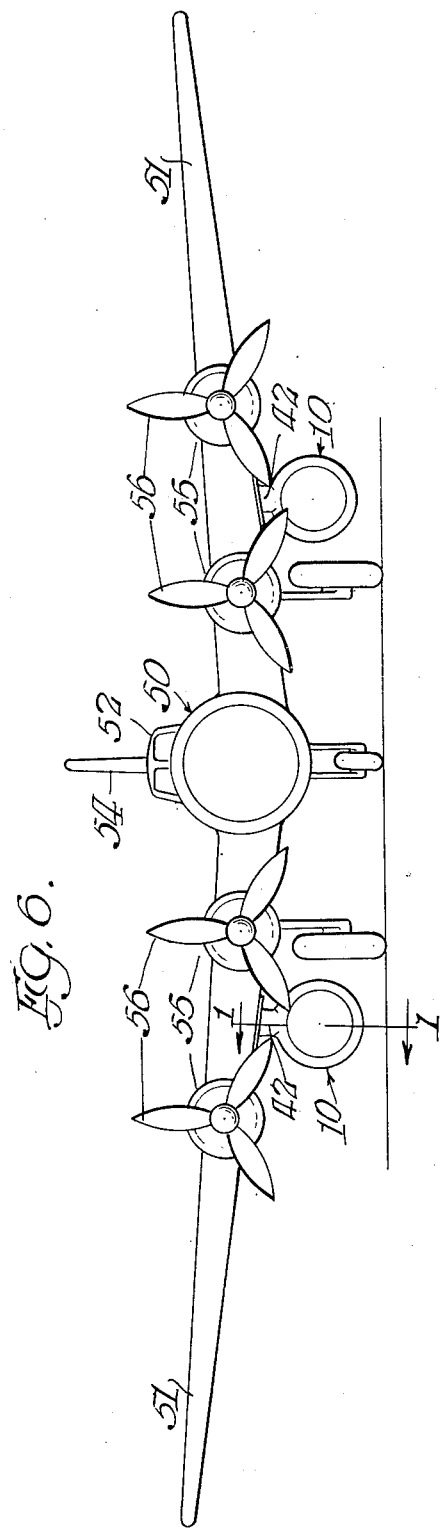
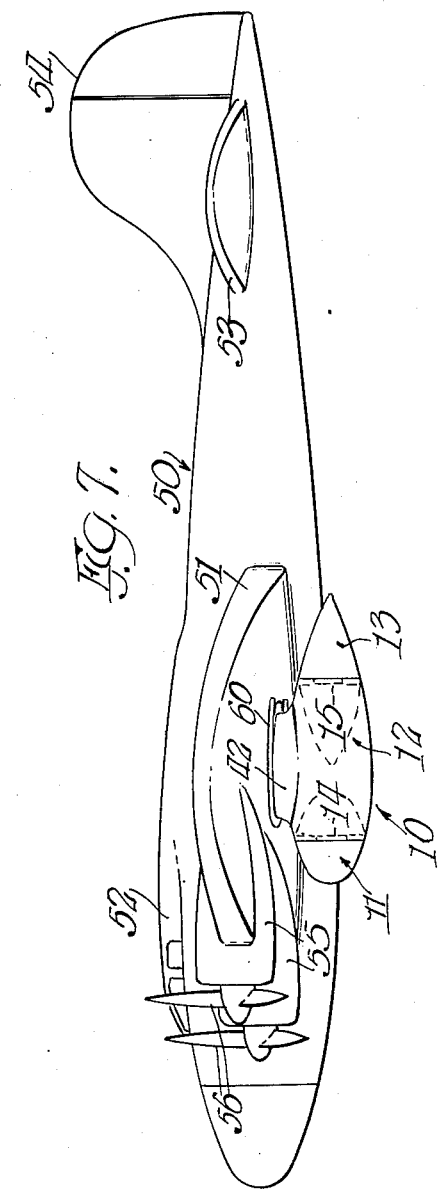
Inventor
Harry W. Protzeller
by Arthur W. Nelson
Atty Patented June 20, 1950

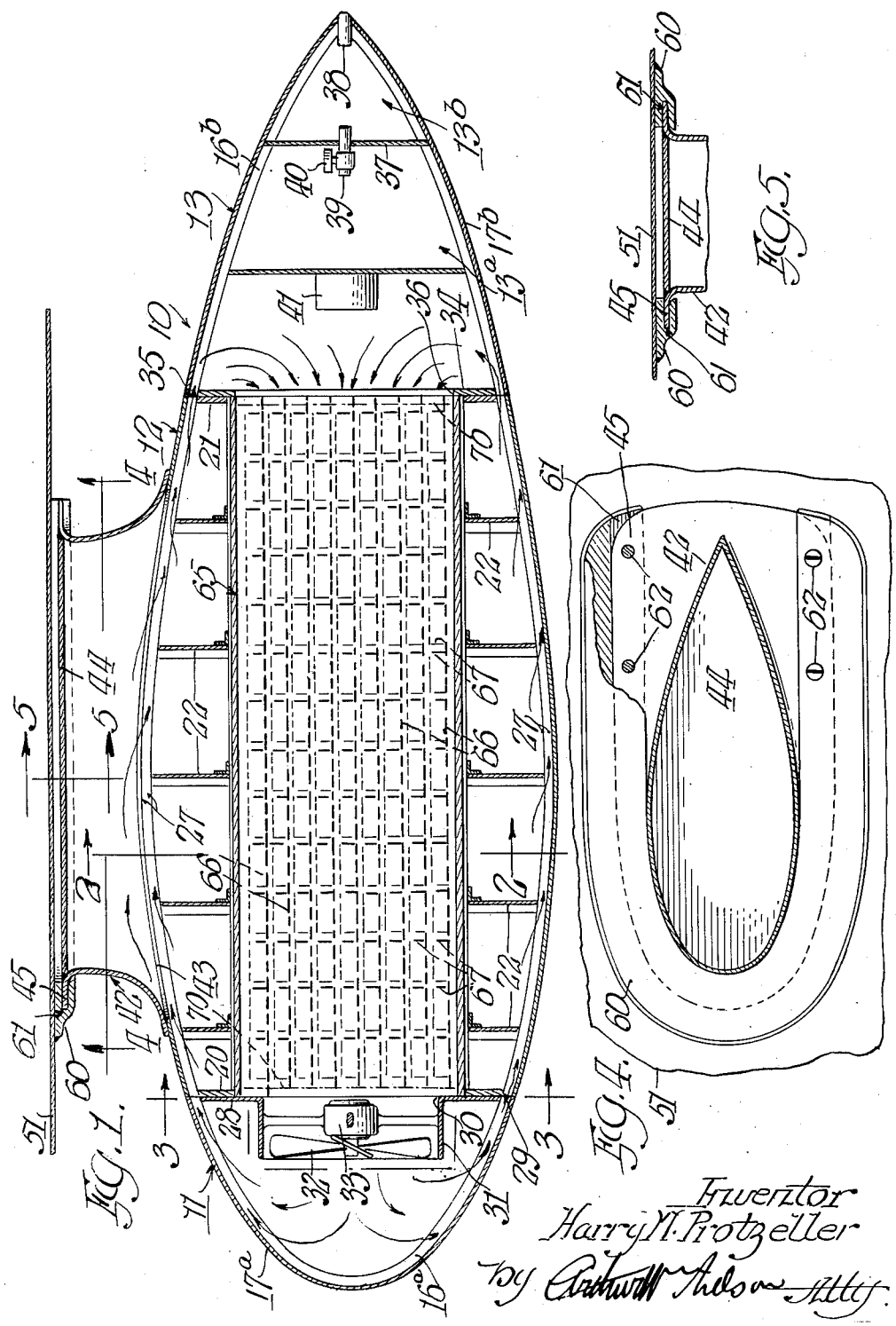

2,511,875

UNITED STATES PATENT OFFICE 2,511,875

METHOD OF REFRIGERATING FOOD PRODUCTS

Harry W. Protzeller, Fairmont, Minn., assignor of one-half to Arthur Wm. Nelson, Park Ridge, Ill.

Application October 7, 1943, Serial No. 505,332

13 Claims. (Cl. 62—170)

This invention relates to improvements in method of refrigerating food products and it consists of the matters hereinafter described and more particularly pointed out in the appended claims.

One of the objects of the invention is to provide a refrigerated food product in which there is retained in the food product, to a greater extent than heretofore, the flavor, color, essential minerals, vitamins and volume.

It is also an object of the present invention to provide a method of refrigerating food products that retains, to an extent greater than heretofore possible, the flavor, color, essential minerals, vitamins and volume of the food products.

Another object of the invention is to provide a method of this kind that may be carried out by the use of an imperforate food product container adapted to be surrounded by a low temperature medium and so constructed that heat units are removed from the products by being absorbed by said medium through the outer skin or covering of the container.

A further object of the invention is to provide a method of this kind adapted to be carried out by an aircraft into a low temperature high altitude air and wherein heat units are transmitted through the outer covering of container to atmosphere to thus accomplish the refrigerating operation.

Again, it is an object of the invention to provide an improved method of freezing food products which is fast and economical and leaves said products in excellent condition for use.

The above mentioned objects of the invention, as well as others, together with the several advantages thereof will more fully appear as the specification proceeds.

In the drawings:

Fig. 1 is a vertical longitudinal sectional view through one form of means for carrying out the invention, as taken on the line 1—1 of Fig. 6 and on a scale enlarged thereover.

Fig. 2 is a transverse vertical sectional view through the improved means as taken on the line 2—2 of Fig. 1 and on a scale enlarged over that of Fig. 1.

Fig. 3 is another transverse vertical sectional view through said means on the scale of Fig. 2 as taken on the line 3—3 of Fig. 1.

Fig. 4 is a horizontal sectional view through a part of the improved means as taken on the line 4—4 of Fig. 1.

Fig. 5 is a transverse vertical sectional view through a part of the means shown in Fig. 1 as taken on the line 5—5 of Fig. 1.

Fig. 6 is a view in front elevation of an airplane equipped with the improved means, when said plane is on the ground.

Fig. 7 is a view in side elevation of the airplane shown in Fig. 6, as when in flight.

In the form shown, the improved means is a streamlined hollow body having an imperforate outer shell or covering formed for the quick conduction of heat units therethrough. This body, which is made to hold the products to be refrigerated is adapted to be detachably connected to and exteriorly carried by an aircraft and it includes internally, means for circulating the air in the body between the contained products and then into engagement with the inner surface of the covering. Thus when the airplane is in flight in a high altitude, low temperature air, the shell is cooled to a correspondingly low temperature and the circulated air gives up the heat units absorbed from the food products, to said shell for conduction therethrough to atmosphere.

Referring now in detail to that embodiment of the invention shown in the drawings and as appears in Figs. 1, 2 and 3 thereof, the improved means is in the form of a streamlined hollow body 10 preferably made as a leading or nose section 11, an open ended main or intermediate food products containing section 12 and a trailing or tail section 13. The nose section and the tail section constitute closures for the open front and rear ends of the main or intermediate section. They are preferably hinged thereto whereby they may be swung from a position closing said ends to a position uncovering said ends for the loading and unloading of food products into and from said intermediate section. In the present instance the hinged connection for said nose and tail sections are so formed that said sections may be swung in a horizontal plane about the vertical hinges 14 and 15 shown in dotted lines in Fig. 7, from the open to the closed position and vice versa.

The main section 12 which is tubular is of the greatest diameter at a point approximately 40% of the total length from the nose and tapers therefrom toward both open ends. Said main section includes a plurality of longitudinal structural members or ribs 16—16 and an outer imperforate shell or covering 17 secured thereto. The structural members, which are arcuately spaced, may take the form of metal T bars, arranged with their flanges or stems 18 extending radially inward and with their heads 19 engaged with and secured to the inner surface of the shell. It is desired that the shell have the capacity of permitting the quick passage of heat units therethrough from the inside to the outside thereof, and therefore it is preferably made of thin sheet metal.

The ribs 16—16 are held in desired spaced relation by means of a plurality of front, rear and intermediate bulkheads 20, 21 and 22 respectively (see Fig. 1) in the form of circular pieces of sheet material, preferably metal. These bulkheads are provided with notches in their peripheries to receive and have secured therein the inner ends of the stems 18 of the ribs 16 as best appears in Figs. 2 and 3.

Centrally in each bulkhead is a square opening (see Fig. 2) of a considerable area and connecting said bulkheads, at the corners of the square openings therein, are longitudinally extending members 24 in the form of angle bars as best appears in Fig. 2. To increase the structural strength of the bulkheads, the front face of each bulkhead has vertical angle bars 25 fixed thereto. The rear face of each bulkhead has horizontal angle bars 26 fixed thereto. These bars are arranged to bound the opening 23 in the respective bulkheads and they engage and are fixed to the vertical and horizontal flanges of the longitudinal angle bars 24, before mentioned. Thus the openings 23 in the bulkheads and the angle bars 24 define a centrally located, longitudinal chamber or passage in the main body portion 12 that extends from one end to the other thereof. With this arrangement it is to be noted also that spaces 27—27 are formed between the periphery of the various bulkheads and the internal surface of the shell or covering 17.

The nose section has a rounded front end and it is flared outwardly at the rear end to match with the front open end of the intermediate or main section 12 as appears best in Fig. 1. Said nose section includes a plurality of longitudinal ribs 16a and a shell or covering 17a that match up with the ribs 16 and shell 17 of said main or intermediate section. The rear end of the nose section includes a bulkhead 28 which engages with and is fixed to the rear ends of the ribs 16a in the same manner as the bulkheads 20—21 and 22 are fixed to the ribs 17. Thus an annular space 29 is provided between the bulkhead 28 and rear end of the shell 17a and whereby circulated air may pass from the rear end of the nose section 11 into the spaces 27 of the section 12.

The bulkhead or partition 28 is formed with a central opening 30 and a forwardly projecting shroud 31 and which opening and shroud are coaxial with the passageway or chamber in the main or intermediate body section. In the front end of the shroud is located an air circulating means shown herein as a fan 32 and a driving motor 33 therefor. Instead of using a driving motor for this fan it may be driven by a propeller located in advance of the nose and connected by a shaft to the fan. However, such a drive would require means for disconnecting the drive as necessary and preferably means for varying the speed of the internal propeller in accordance with the density of the atmosphere within the container.

The trailing or tail section 13 tapers toward its rear end from its front end, which matches the open rear end of the main body section. The tail section includes a plurality of longitudinal ribs 16b and a shell or covering 17b that match with the ribs 16 and covering 17 at the rear end of the intermediate section. The front end of the tail section includes a bulkhead or partition 34 which engages with and is fixed to the ribs 16b in the same manner as the bulkheads 20, 21 and 22 are fixed to the ribs 17. Thus an annular space 35 is provided between the bulkhead and rear end of the shell 17b and whereby air may pass from the rear end of the main section 12 into the front end of the tail section 13. The bulkhead 34 is provided with a rectangular opening 36 which registers with the rear end of the chamber in said main section.

37 indicates a partition disposed toward the rear end of the tail section 13 to divide the tail section into front and rear chambers 13a and 13b respectively. A vent 38 is provided at the apex of the rear section connecting compartment 13b with atmosphere. The partition 37 which functions as a seal between the compartments 13a and 13b carries an axially disposed pressure equalizing tube 39 which opens into both chambers 13a and 13b. That end of the tube 39 within the chamber 13a is provided with an electrically operated valve 40 adapted to be controlled from a point remote therefrom. In said compartment 13a is provided a casing 41 to house suitable gauges whereby the pressure and the temperature existing within the member 10 as a whole may be indicated at a point remote therefrom. By the means just above mentioned the pressure and the temperature in the hollow body 10 as a whole may be controlled from said remote point.

The main or intermediate section 12 is provided along its top median line with a fairing like hollow strut 42. An opening 43 is provided in the shell 17 in line with the bottom of the strut so that communication for air circulation is afforded between the upper portion of the main section 12 and the interior of the strut. The top end of said strut, which is closed by a plate 44 includes an outwardly extending top flange 45. It is through this flange 45 whereby the hollow body 10 as a whole may be detachably connected to a support adapted to be disposed in a low temperature medium.

Primarily one or more of the hollow bodies above described is or may be carried exteriorly of an aircraft so that the same may be transported to a high altitude where low temperature air exists. In Figs. 6 and 7 I have shown a four motored airplane that includes a fuselage 50, laterally extending wings 51, operator's cabin 52 and horizontal and vertical tail end rudders 53 and 54 respectively. Each wing carries nacelles 55, each enclosing a suitable motor or engine that drives a propeller 56.

In the present instance, two of the hollow bodies 10—10 are shown as carried exteriorly by the plane. For purpose of balance one is disposed under each wing so as to extend in a fore and aft direction and arranged in a plane between the two nacelles of the associated wing so as to depend from the underside thereof. In a smaller plane, wherein only one of said bodies is to be carried thereby, it may be detachably connected to the bottom of the fuselage of said plane.

It will be observed that the bodies 10 are spaced an equal distance from the longitudinal axis of the plane. Likewise, they are so disposed on the plane as to be substantially at the center of pressure line. In this way the bodies 10 do not interfere with stability characteristics of the plane.

It is preferred that each body 10 be detachably connected to the associated wing and therefore I affix to the bottom metal sheet of each wing, an elongated substantially horseshoe or U-shaped attaching flange 60, the rear and open end of the same being directed toward the rear edge of the wing. The rear ends of the side arms of this flange are parallel as best appears in Fig. 4 and in the inner edge of this flange is a groove 61 into which the flange 45 of the fairing strut before mentioned may be inserted from the rear end of the flange. When the flange 45 is engaged in the groove 61, fasteners 62—62 are inserted into registering openings in the flanges 45 and 60 respectively and whereby the body 10 as a whole is detachably secured in place in a pendent condition.

The channel in the main or intermediate section 12 as defined by the openings 23 of the bulkheads or partitions therein is adapted to receive an open ended container 65 of such a rectangular cross section that the corners thereof have a sliding fit in the angle bars 24. The sides and the top and bottom walls of this container are preferably made of best insulating material. When said container 65 is in place in the channel or chamber before mentioned, its front end is adapted to be engaged with the bulkhead or partition 28 of the nose section when the same is closed and its rear end is adapted to be engaged by the bulkhead 34 of the tail section when the same is closed. Thus when the container is in place and the nose and tail sections are in the position closing the front and rear open end of the main or intermediate section, the container is secured in place against endwise shifting.

The container is provided with a plurality of vertically spaced horizontally disposed foraminous shelves 66 which are best indicated in dotted lines in Figs. 1 and 2. Shelves of openwork wire fabric or expanded metal serve the purpose.

The food product to be refrigerated or frozen is preferably arranged in the form of unit-like packages, boxes, or baskets or cartons indicated at 67 and are so disposed upon said shelves as to leave longitudinal and transverse passages or spaces therebetween as best appears in Figs. 1 and 2.

It is to be understood that the shelves may be loaded before they are placed in the container and into which they may be slid from one end. The container may be slipped into the main section of the body 10 from either end after the associated nose or tail section has been swung into the open position, it being assumed that said body 10 as a whole has been applied to the airplane as before described. After the container has been placed in the main section 12, say from the open rear end, and has been loaded with food products, the tail section 13 is then swung into the position closing said end of the main section and it is then suitably locked in the closed position.

The airplane may now take off for a flight to some selected destination and in its flight rises to a high altitude where low temperature air prevails. The operator in the cabin 52, upon reading the temperature and pressure in the body 10 from the instruments in the housing 41, may now start the motor 33 in each nose section 11 to drive the associated fan 32. Each fan when driven, will create a blast of air which will impinge the interior of the nose section to follow the internal surface thereof and pass through the openings 29 to enter the front end of the passage 27. By means of the front, rear and intermediate bulkheads or partitions 21—21 and 22, the moving air is directed into contact with the internal surface of the shell 17, to pass out the rear ends of said passage 27 into the chamber 13a of the tail section for re-entrance into the rear end of the container. In its circulation and passage through the container, the air column passes between, about and over the food products 67 and will absorb heat units therefrom to be carried out through the shroud 31 into the nose section. Thus the air contained in the body 10 as a whole, as it passes through the container, will absorb heat units from the food products and which are given up to the colder shell parts for passage therethrough, by conduction, to the surrounding atmosphere and dissipated therein. As the interior surface of the fairing sheet is in communication with the interior of the body 10 as a whole, by reason of the opening 43, it adds its surface to that of the shell for heat absorbing and conducting purposes.

Should it be indicated by the instruments in the housing 41, before mentioned, that the pressure in the body 10 is higher or lower than that of the surrounding atmosphere, the operator in the cabin of the plane may, if he desires, energize the valve 40 to open the tubing 39 so that air from the chamber 13b will enter or leave the chamber 13a and equalize the pressure therein.

After the plane lands at its destination, the nose end and the tail sections are opened and temporary doors indicated by the dotted lines 70 in Fig. 1 are inserted into the open ends of the container to close the same. The container as a whole may be now slid endwise outwardly from either open end of the main section to be carried away, as by motor truck for cold storage or other disposal. Thereafter, another container may be inserted into the main body section 12 and the nose and tail sections moved to the closed position and the plane is again ready for flight to another destination.

By means of the construction described, it is possible to use airplanes for combination purposes, because passengers, mail and express matter may be carried in the fuselage at the same time that the products are being refrigerated and carried suspended from the wings of the airplane. However, if desired, the bodies 10—10 may be removed from the airplane so that it may be used as a standard airplane only.

Thus the food products are not only transported, but may be processed at the same time. By reason of the simple control afforded for the internal pressures in the body 10, the food products may be regulated best to maintain the desired characteristics in the products.

When products are frozen on the earth's surface by methods and means heretofore devised and such as are in general use there are certain inherent disadvantages. This is primarily due to the surrounding air conditions, since during the freezing process only one of these conditions of the air is changed, i. e. the temperature, the pressure and relative density remaining the same. Hence, as the initial temperature of the product is lowered there is a volumetric reduction in the product due to heat contraction. This reduction in volume continues to within a few degrees of the freezing point. Such contraction creates a pressure on the internal liquids and cells of the product, which forces some of the liquid, closest to the external walls, through these walls. It collects on the exterior of the product in the form of moisture. Generally, this moisture has a freezing point several degrees higher than that of the solid portion of the product and hence freezes first. As the solid portion freezes, expansion takes place, which causes a disturbance on the exterior walls, thereby causing the already frozen moisture to drop off. In many food products this loss of liquid amounts to some 10 to 12 percent of the original weight of of the product. Usually the flavoring, coloring and vitamin or mineral elements, that are extremely important in all fruits and vegetables, are contained in the liquids and are generally concentrated adjacent to the exterior walls. Therefore in freezing operations, as heretofore practiced, not only is there a serious loss of weight, but also a definite and important impairment in quality by loss of valuable constituents of the product.

In accordance with the teaching of the present invention it is possible to lower the pressure as the product is reduced in temperature and thus counteract the tendency of the product to contract. Hence, the size of the product may be maintained and the loss of weight and of vital parts of the product avoided. The end result is a frozen food product which is far superior to frozen food products heretofore produced and which embodies substantially the qualities of the product in its natural state.

Because the product is within a substantially air tight chamber and because the air for cooling is constantly recirculated, the dehydration losses are low compared to those in methods where fresh cold air is constantly brought into contact with the product.

While, in describing the invention, I have referred in detail to the form, arrangement and construction of the parts involved, the same is to be considered only in the illustrative sense so that I do not wish to be limited thereto except as may be specifically set forth in the appended claims.

I claim as my invention:

1. The process of transport refrigeration of food products which comprises conveying the food products, at high altitude where low temperatures obtain, in a closed container having an imperforate covering capable of the quick transmission of heat units therethrough, the food products in said container being in spaced relation to each other and to said covering so that an annular passage is present between the spaced food products and the covering respectively, circulating the air in the container between and about the spaced food products in one direction to absorb heat units therefrom and then through said passage in the other direction in a manner transferring said absorbed heat units to and through the covering for absorption by said low temperature external atmosphere.

2. The process of transport refrigeration of food products which comprises conveying the food products, at high altitudes where low temperatures obtain, in a closed container having an imperforate covering capable of the quick transmission of heat units therethrough, the food products being in an open ended chamber that is spaced inwardly from said covering so as to leave an annular passage between said covering and said chamber, causing a circulation of air in said container through said chamber and between the food products therein in one direction from one end to the other and back through said passage in the other direction toward the first mentioned end of the chamber to transmit heat units absorbed from said food products to and through said covering for absorption by the low temperature external atmosphere.

3. The process of transport refrigeration of food products which comprises conveying the food products, at high altitudes where low temperatures and pressures obtain, in a closed container having an imperforate cover capable of the quick transmission of heat units therethrough, the food products in said container being in spaced relation to each other and to said covering so that an annular passage is present between the food products and the covering respectively, and circulating the air in the container between and about the spaced food products to absorb heat units therefrom and through said passage in a manner transferring the absorbed heat units to and through said covering for absorption by said low temperature external atmosphere.

4. The process of transport refrigeration of food products which comprises conveying the food products, at high altitudes where low temperatures and pressures obtain, in a closed container having an imperforate cover capable of the quick transmission of heat units therethrough, the food products being within an open ended chamber that is spaced inwardly from said covering so as to leave an annular passage between said covering and said chamber, and circulating the air in said container through said chamber and between the food products therein from one end to the other to absorb heat units from said products and back through said passage to the first mentioned end of the chamber to transfer the absorbed heat units to and through the covering for absorption by said low temperature external atmosphere.

5. The method of transport refrigeration of food products which comprises conveying the food products within the closed shell of a traveling carrier and at high atmospheric altitudes from a starting point to a predetermined destination distant therefrom, circulating air within the closed carrier into heat absorbing relationship to the food products interiorly of the carrier shell and thence into heat transmitting relationship to the shell of said carrier during transit, thereby conducting the heat through said shell and dissipating it to the surrounding atmosphere, thereby refrigerating the product during transit.

6. The method of transport refrigeration of food products which comprises conveying the food products within the closed shell of a traveling carrier and at high atmospheric altitudes from a starting point to a predetermined destination distant therefrom, circulating air within the closed carrier into contact with the food products interiorly of the carrier shell and into contact with the shell of said carrier during transit, thereby conducting the heat through said shell and dissipating it to the surrounding atmosphere, thereby refrigerating the product during transit.

7. The method of producing refrigeration of products which consists in placing the product to be refrigerated within a hollow shell and in spaced relation to the interior wall surfaces of the shell; closing the shell to make it imperforate and to provide a gaseous interior, transporting the product-laden shell, by aircraft, to and through atmospheric air at such altitudes as provides a refrigerating temperature, and whilst product-laden shell is being so transported, causing circulation of the gaseous medium within the product-laden shell so as to bring the gaseous medium into heat exchanging relation with the product and the interior surface of the product-laden shell and by conduction through the shell to thereby effect refrigeration of the product.

8. The method of producing refrigeration of products which consists in placing the product to be refrigerated within a hollow elongated shell; closing the shell to make it imperforate and to provide a gaseous interior, transporting the product-laden shell, by aircraft, to and through atmospheric air at such altitudes as provides a refrigerating temperature, and whilst product-laden shell is being so transported, causing longitudinal circulation of the gaseous medium within the product-laden shell so as to bring the gaseous medium into heat exchanging relation with the product and the interior surface of the product-laden shell and by conduction through the shell to thereby effect refrigeration of the product.

9. The method of producing refrigeration of products which consists in placing the product to be refrigerated within a hollow shell, so as to leave an annular space between the product and the interior of the shell; closing the shell to make it imperforate and to provide an interior having an air content, transporting the product-laden shell, by aircraft, to and through atmospheric air at such altitudes as provides a refrigerating temperature, and whilst product-laden shell is being so transported through the atmospheric air of refrigerating temperature, causing circulation of the air within the product-laden shell so as to bring the air into heat exchanging relation with the product and the interior surface of the product laden shell to thereby effect refrigeration of the product.

10. The method of producing refrigeration of products which consists in placing the product to be refrigerated within a hollow metal shell in spaced relation to each other; closing the shell to make it imperforate and to provide an interior having an air content, transporting the product-laden shell, by aircraft, to and through atmospheric air at such altitudes as provides a refrigerating temperature, and whilst product-laden shell is being so transported, causing circulation of the air within the product-laden shell so as to bring the air into heat exchanging relation with the product whilst moving in one direction and into heat exchanging relation with the interior of the said shell whilst moving in the other direction, to thereby effect refrigeration of the product.

11. The method of producing refrigeration of products which consists in placing the product to be refrigerated within a hollow shell and in spaced relation to the interior wall surfaces of the shell; closing the shell to make it imperforate and to provide a gaseous interior, transporting the product-laden shell, by aircraft, to and through atmospheric air at such altitudes as provides a refrigerating temperature, and whilst product-laden shell is being so transported, causing circulation of the gaseous medium within the product-laden shell so as to bring the gaseous medium into heat exchanging relation with the product and the interior surface of the product-laden shell and by conduction through the shell to thereby effect refrigeration of the product, and in reducing the pressure of the gaseous medium as the temperature of the product is reduced, so as to offset, at least in part, the tendency of the product to diminish in volume as its temperature is lowered.

12. The method of producing refrigeration of products which consists in placing the product to be refrigerated within a hollow shell and in spaced relation to the interior wall surfaces of the shell; closing the shell to make it imperforate and to provide a gaseous interior, transporting the product-laden shell, by aircraft, to and through atmospheric air at such altitudes as provides a refrigerating temperature, and whilst product-laden shell is being so transported, causing circulation of the gaseous medium within the product-laden shell so as to bring the gaseous medium into heat exchanging relation with the product and the interior surface of the product-laden shell and by conduction through the shell to thereby effect refrigeration of the product, and in reducing the pressure of the gaseous medium as the temperature of the product is reduced, so as substantially to maintain the original volume of the product as the temperature of the product is lowered.

13. The method of producing refrigeration of products which consists in placing the product to be refrigerated within a hollow shell and in spaced relation to the interior wall surfaces of the shell; closing the shell to make it imperforate and to provide a gaseous interior, transporting the product-laden shell, by aircraft, to and through atmospheric air at such altitudes as provides a refrigerating temperature, and whilst product-laden shell is being so transported, causing circulation of the gaseous medium within the product-laden shell so as to bring the gaseous medium into heat exchanging relation with the product and the interior surface of the product-laden shell and by conduction through the shell to thereby effect refrigeration of the product, and in reducing the pressure of the gaseous medium as the temperature of the product is reduced so as to prevent a reduction in the volume of the product as its temperature of the product is lowered.

HARRY W. PROTZELLER.

REFERENCES CITED

The following references are of record in the file of this patent:

UNITED STATES PATENTS

| Number | Name | Date |
|---|---|---|
| 1,702,194 | Bosch | Feb. 12, 1929 |
| 1,907,048 | Midgeley, Jr. | July 4, 1933 |
| 1,992,941 | Fowler | Mar. 5, 1935 |
| 2,109,002 | Warren | Feb. 22, 1938 |
| 2,184,954 | Conn | Dec. 26, 1939 |
| 2,203,406 | Dempsey, Jr. | June 4, 1940 |
| 2,259,803 | Cumming | Oct. 21, 1941 |
| 2,285,946 | Kalischer | June 9, 1942 |